(No Model.) 6 Sheets—Sheet 2.
E. B. BEECHER & R. T. ELLIOTT.
MACHINE FOR MAKING MATCH BOXES.
No. 281,958. Patented July 24, 1883.
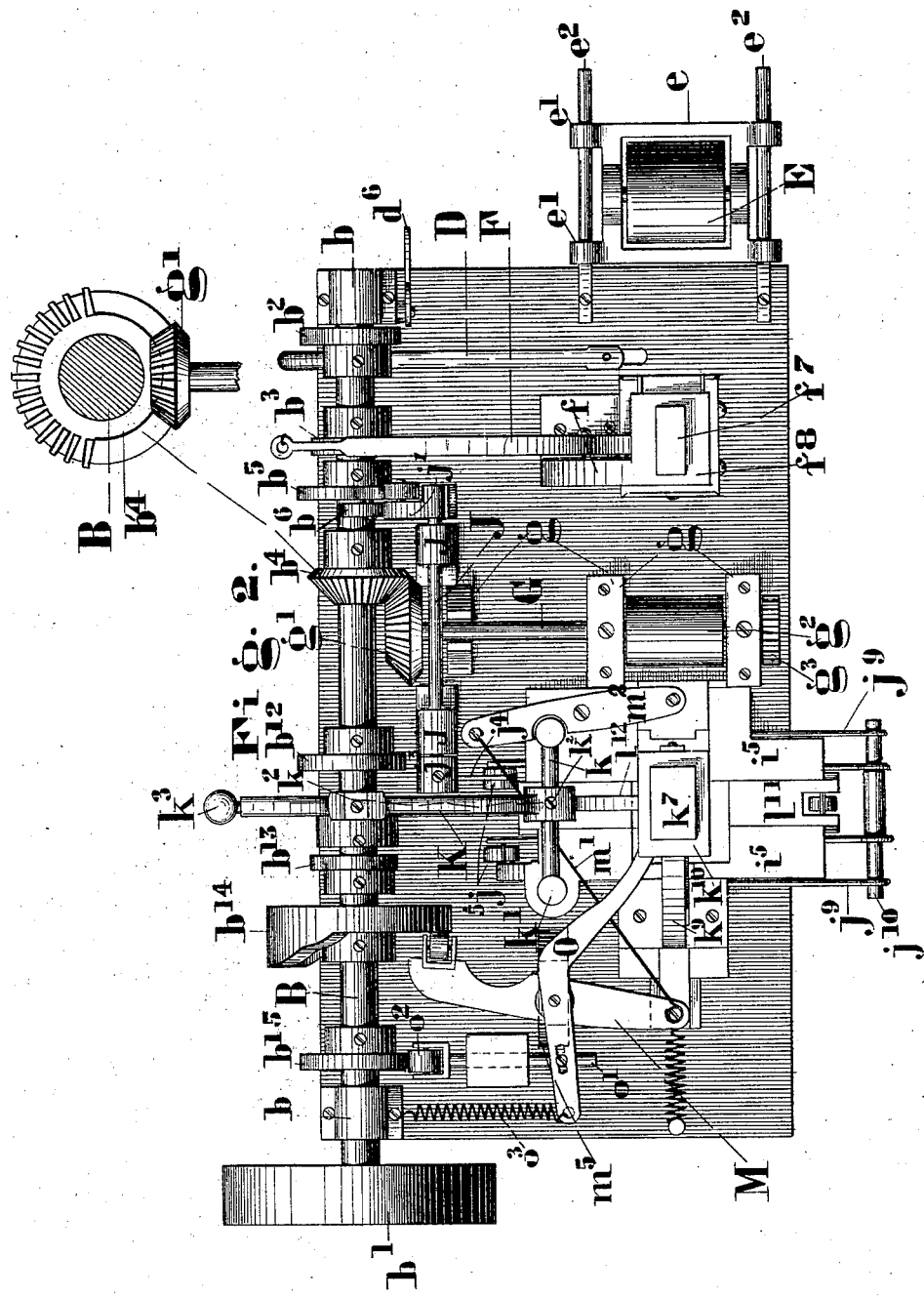
WITNESSES:
T. S. West
Wm T. Emerson
INVENTORS:
E. B. BEECHER,
R. T. ELLIOTT,
BY H. W. Beadle & Co.
ATTYS (No Model.) 6 Sheets—Sheet 3.
E. B. BEECHER & R. T. ELLIOTT.
MACHINE FOR MAKING MATCH BOXES.
No. 281,958. Patented July 24, 1883.
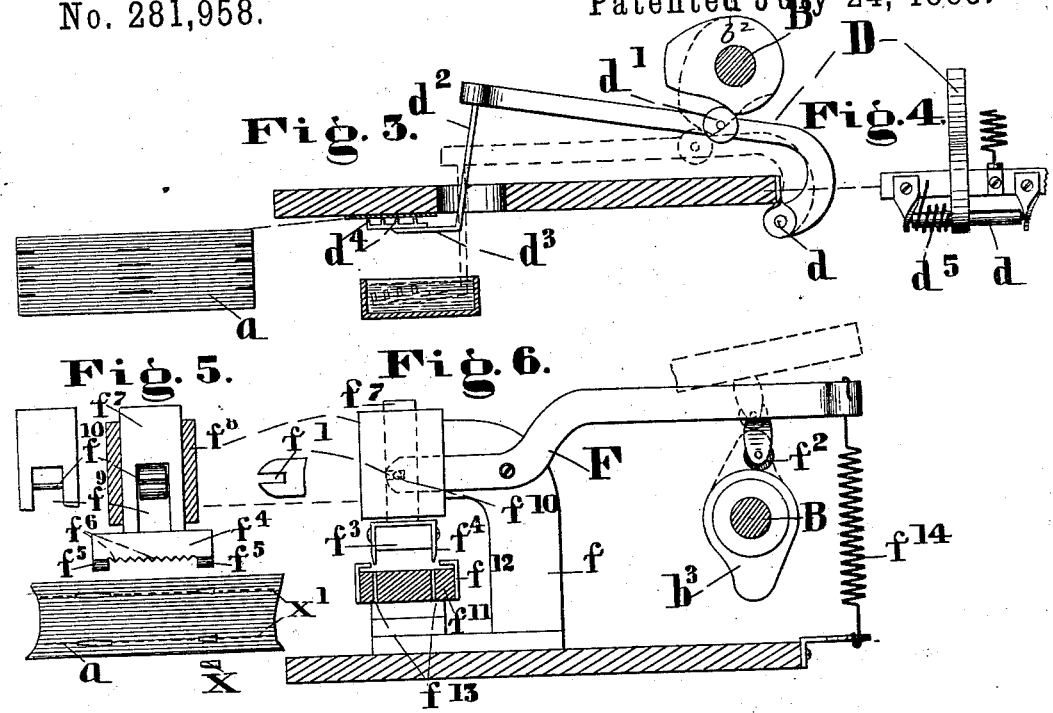
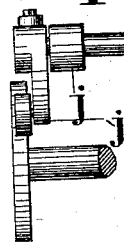
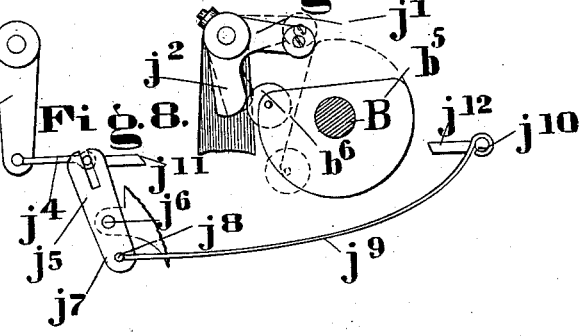
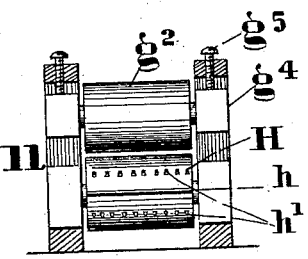
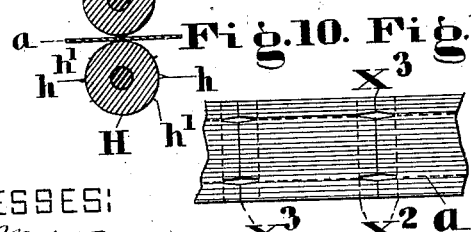
WITNESSES:
T. S. West
Wm. T. Emerson
INVENTORS:
E. B. BEECHER,
R. T. ELLIOTT,
BY H. W. Beadle & Co.
ATTYS.

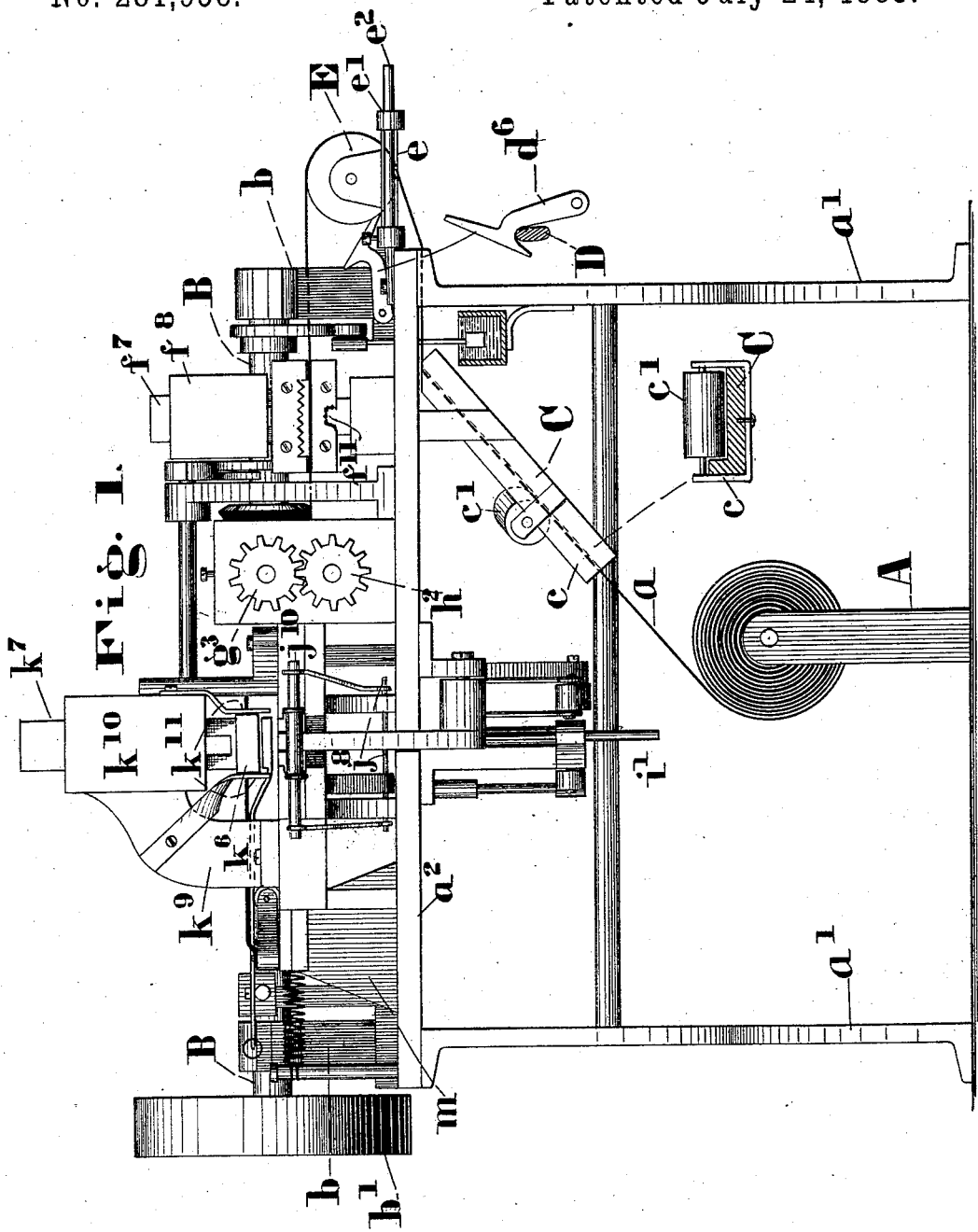

(No Model.) 6 Sheets—Sheet 4.
E. B. BEECHER & R. T. ELLIOTT.
MACHINE FOR MAKING MATCH BOXES.
No. 281,958. Patented July 24, 1883.
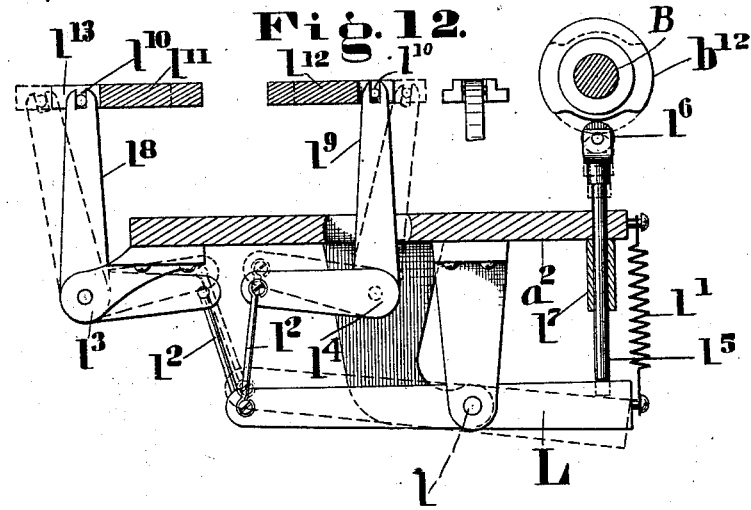
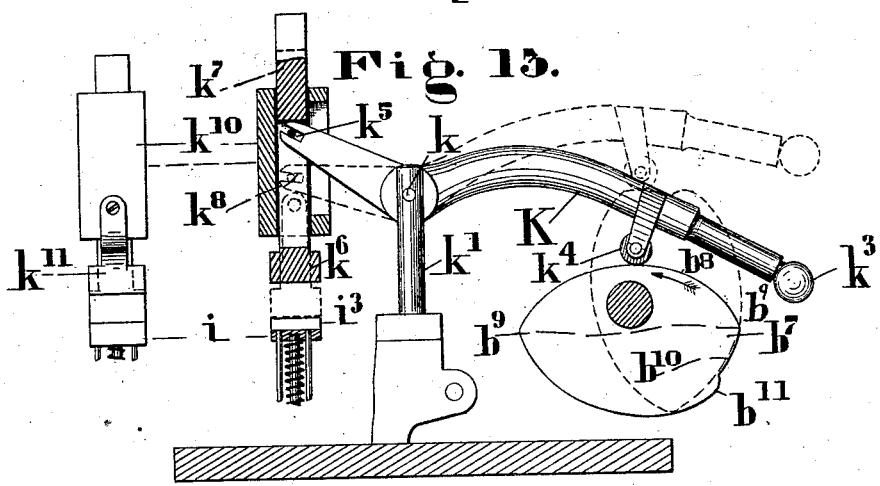
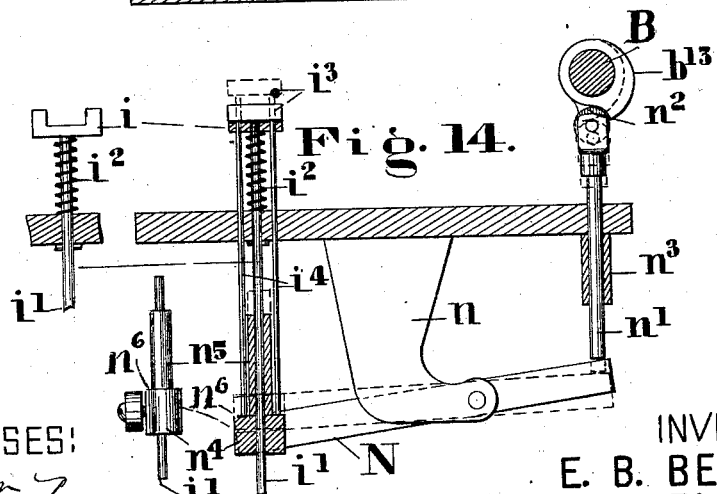
WITNESSES:
T. S. West.
Wm. T. Emerson.
INVENTORS:
E. B. BEECHER,
R. T. ELLIOTT,
BY H. W. Beadle & Co. ATTYS.

(No Model.)   6 Sheets—Sheet 5.

E. B. BEECHER & R. T. ELLIOTT.
MACHINE FOR MAKING MATCH BOXES.

No. 281,958.   Patented July 24, 1883.

WITNESSES:
T. S. West
Wm. T. Emerson

INVENTORS:
E. B. BEECHER,
R. T. ELLIOTT,
BY H. W. Beadle & Co
ATTYS.

(No Model.) 6 Sheets—Sheet 6.
E. B. BEECHER & R. T. ELLIOTT.
MACHINE FOR MAKING MATCH BOXES.
No. 281,958. Patented July 24, 1883.
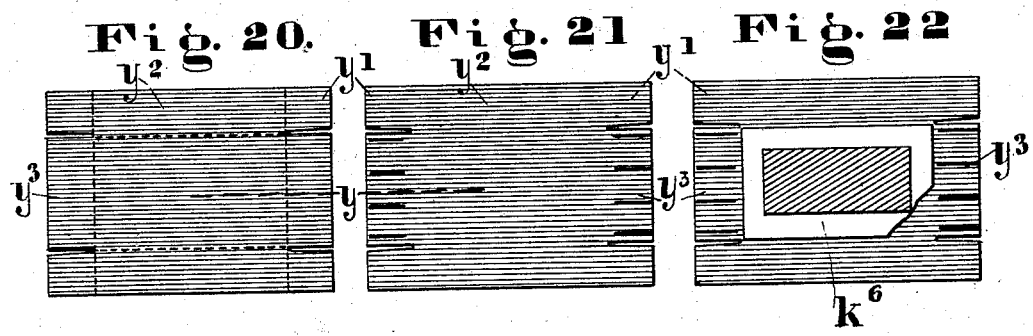
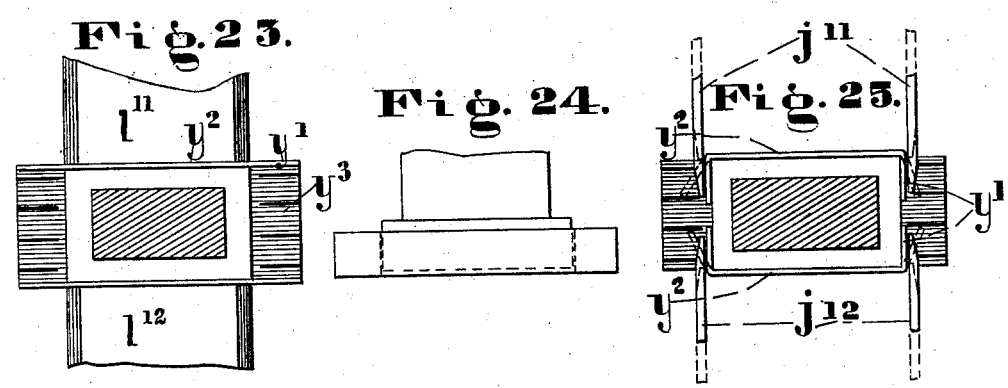
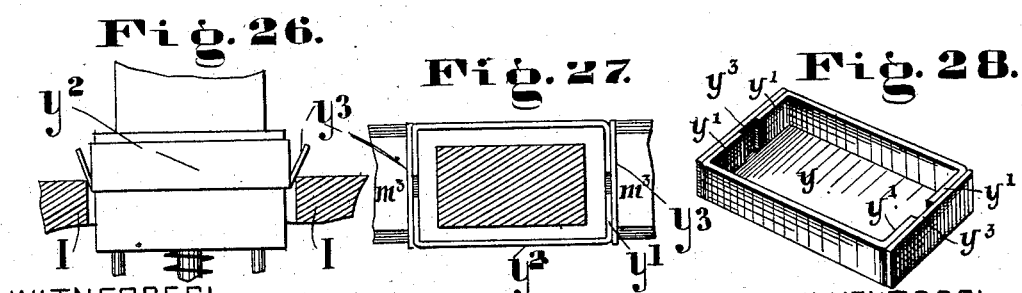
WITNESSES:
T. S. West.
Wm. T. Emerson.
INVENTORS:
E. B. BEECHER,
R. T. ELLIOTT,
BY H. W. Beadle &c. ATTYS

UNITED STATES PATENT OFFICE.

EBENEZER B. BEECHER, OF WESTVILLE, CONNECTICUT, AND ROBERT T. ELLIOTT, OF WILMINGTON, DELAWARE, ASSIGNORS TO THE DIAMOND MATCH COMPANY, OF WILMINGTON, DELAWARE.

MACHINE FOR MAKING MATCH-BOXES.

SPECIFICATION forming part of Letters Patent No. 281,958, dated July 24, 1883.

Application filed July 27, 1882. (No model.)

*To all whom it may concern:*

Be it known that we, EBENEZER B. BEECHER, of Westville, Connecticut, and ROBERT T. ELLIOTT, of Wilmington, Delaware, have invented new and useful Improvements in Machines for Making Match-Boxes; and we do hereby declare that the following is a full and exact description of the same, reference being had to the accompanying drawings, and to the letters of reference marked thereon.

This invention is designed for making the drawer portion of what is commonly known as the "parlor match-box;" and it consists, mainly, in certain combinations of mechanisms adapted to act successively upon a pasteboard strip and to produce therefrom complete and perfect boxes without hand manipulation.

It consists, further, in certain specific details of construction, which, in connection with the foregoing, will be fully described hereinafter.

Figure 15:
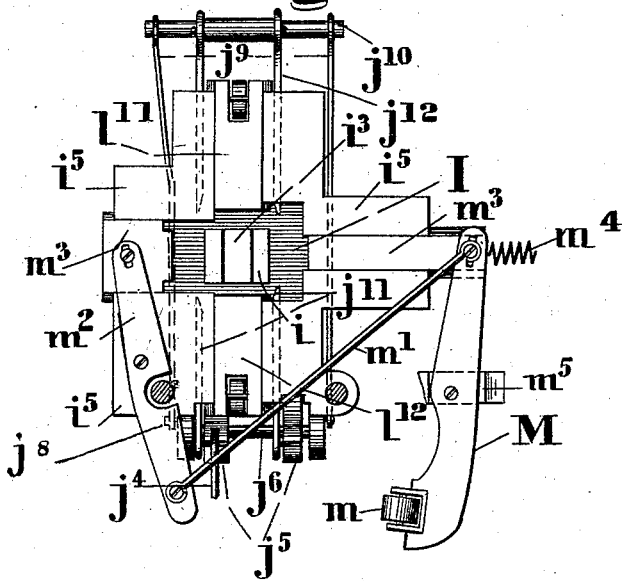
Figure 16:
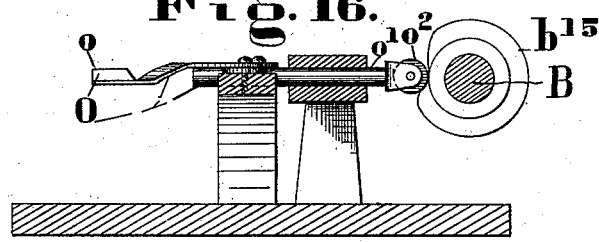
Figure 17:
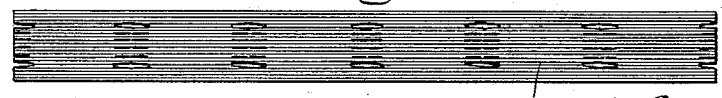
Figure 18:
Figure 19:
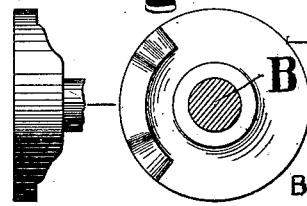

In the drawings, Figure 1 represents a side elevation of our improved machine; Fig. 2, a plan view of the same; Figs. 3 and 4, detached views of the mechanism for applying the glue to the strip; Figs. 5 and 6, detached views of the mechanism for scoring the strip longitudinally and removing the excess portions of the same; Figs. 7, 8, and 9, detached views of the finger-bar mechanism for folding in the end pieces of the blank; Figs. 10 and 11, detached views of the rollers for scoring and cutting the strip transversely and for delivering the box-blank thus made to the box-forming mechanism; Fig. 12, a detached view of the side plunger-block mechanism; Fig. 13, a detached view of the former-block mechanism; Fig. 14, a detached view of the yielding portion of the bed-block I and the independent block $i^3$, forming a part of the same, by means of which the completed box is lifted to the plane in which moves the ejecting or discharging mechanism; Fig. 15, a detached view of the box-forming mechanisms; Fig. 16, a detached view of the mechanism for ejecting or discharging the completed box from the machine; Fig. 17, a view of that side of the pasteboard strip to which the glue is applied; Fig. 18, a view of that side which is scored and cut; Fig. 19, a detached view of the cam $b^{14}$; Figs. 20, 21, 22, 23, 24, 25, 26, and 27, views illustrating the formation of the box; and Fig. 28, a perspective view of the completed box.

To enable others skilled in the art to make our improved machine and properly use the same, we will proceed to describe fully its construction and manner of operation.

A, Fig. 1, represents a standard of any suitable construction, located at any proper point, which is adapted to support in any proper way a roll of pasteboard in such manner as to permit the same to revolve when the end of the continuous strip $a$ is taken by the machine.

$a'$ $a'$ represent the legs or standards of the machine, and $a^2$ the table or frame plate supported thereby, which table serves as a foundation or base-piece for supporting the other parts.

B, Figs. 1 and 2, represents the main shaft, supported above the table by proper bearing-standards, $b$ $b$, which is provided at one end with the pulley $b'$, for receiving movement from any suitable source of power.

C, Fig. 1, represents a guiding-plate suspended below the table, which is provided with a flange, $c$, on one side, and with an inclined roller, $c'$, which latter serves to keep the edge of the pasteboard against the guiding-flange $c$ as it moves forward toward the machine.

D, Figs. 2, 3, and 4, represents a bent arm, the rear end of which is provided with a transverse pivot-shaft, $d$, held in hangers depending from the rear edge of the table, as shown in Figs. 3 and 4, and which is provided near the rear end of its horizontal portion with a friction-roller, $d'$, and at its front end with a vertical rod, $d^2$, extending through a prop or opening in the table, this rod itself being provided with a horizontal portion, $d^3$, having vertical studs or fingers $d^4$, as shown.

$d^5$, Fig. 4, represents a spring of any proper construction, by means of which the arm is returned to its normal position after having been moved therefrom.

$b^2$ represents a cam upon the main shaft, which is adapted at the proper time in the revolution of the latter to depress the forward end of the arm D against the action of the spring $d^5$.

By the depression of the front end of the arm D, the horizontal portion $d^3$ is caused to dip into a glue-box held in proper relation thereto, as shown in dotted lines, Fig. 3. By the lifting up of the front end of the arm, then, through the action of the spring $d^5$, when the latter is released by the cam, the horizontal portion $d^3$ is caused to apply by means of its fingers $d^4$ the glue taken by it from the box to the proper places upon the lower side of the intermittently-moving strip $a$, the latter being held stationary at this time to permit this action.

$d^6$, Figs. 1 and 2, represents a pivoted catch-arm, by means of which the front end of arm D may be held in its depressed position when the machine is not in use.

E, Figs. 1 and 2, represents a roller supported by proper bearings upon the plate $e$, having ears $e'\ e'$, as shown; and $e^2\ e^2$, rods extending from the table through the ears $e'\ e'$, for the purpose of supporting the plate, as shown. Two of the ears $e'$ are provided with set-screws, as shown in Fig. 1, for the purpose of securing the plate in any desired position. By means of this construction the roller may be adjusted nearer to or farther from the table for the purpose of varying the distance traveled by the strip, so that a longer or shorter time may be afforded for the cooling of the glue before the completion of the box, as may be necessary at different temperatures.

F, Figs. 2 and 6, represents a bent arm pivoted near its front end to the standard $f$, which arm is provided at its front end with a recess, $f'$, Fig. 6, and near its rear end with a friction-roller, $f^2$, as shown.

$f^3$, Fig. 6, represents a quadrangular block, which is provided on each side with a plate, $f^4$, Fig. 5, having at each end a die, $f^5$, and in the space between the ends a series of teeth, $f^6$, as shown.

$f^7$ represents a vertical arm or shank rigidly secured to the block, which is adapted to slide in the guide-box $f^8$ of the standard $f$, as shown.

$f^9$ represents a recess in the arm $f^7$, and $f^{10}$ a rod or pin adapted to lie in the recess $f'$ of the arm F.

$f^{11}$, Fig. 6, represents a supporting table or bed located in line below the block $f^3$, which is provided with the side plates, $f^{12}$, having the overhanging flanges for guiding the pasteboard strip, and also with the die-openings $f^{13}$, corresponding in size and position with the dies $f^5$ upon the block $f^3$.

$f^{14}$ represents a spring of any proper construction, by means of which the arm F is returned to its normal position after having been moved therefrom.

$b^3$ represents a cam upon the main shaft, which is adapted at the proper time in the revolution of the latter to depress the forward end of the arm F against the action of the spring $f^{14}$. By the descent of this arm the block $f^3$ is caused to cut out the excess portion $x$ of the strip $a$ and score the same on the lines $x'\ x'$, Figs. 5 and 18.

G, Fig. 2, represents a shaft supported by proper bearings, $g\ g\ g$, rising from the table $a^2$, which is provided at its rear end with the bevel-gear wheel $g'$, adapted to engage with the mutilated bevel-wheel $b^4$ on the main shaft, and provided near its front end with the roller $g^2$ and at its extreme front end with the wheel $g^3$, as shown.

$g^4$, Fig. 11, represents one of the journal-boxes of the roller G, which is capable of movement in a vertical direction, and $g^5$ an adjusting-screw by means of which the position of the journal-box may be determined.

H, Fig. 11, represents a roller held in bearings below the roller $g^2$, which is provided upon opposite sides of its circumference with a longitudinal cutting-blade, $h$, and two parallel scoring-blades, $h'\ h'$, as shown in Figs. 10 and 11, and has at its outer end the gear-wheel $h^2$, as shown in Fig. 1.

By the revolution of the mutilated gear $b^4$ on the shaft B, an intermittent movement is given to the shaft G, having roller $g^2$, and by means of the wheel $g^3$ on this shaft motion is communicated by the gear-wheel $h^2$ to the roller H. By the movement of these rollers the strip of pasteboard is drawn from the roll before described above the part $d^3$ of the mechanism for applying the glue, before described, and below the die cutting and scoring mechanism before described into and through the rollers to the box-forming mechanism, the strip also being scored on the lines $x^2\ x^2$ and cut on the line $x^3$ in its passage between the rollers. Complete severance is not effected by the cut on line $x^3$, sufficient material being left uncut to preserve the continuity of the strip until the end blank has reached its final position upon the bed of the box-forming mechanism. When this position has been reached, the separation of the blank from the strip is easily effected at the proper time by the action of the box-forming mechanism.

I, Fig. 15, represents the bed-block of the box-forming mechanism, which is located in a proper horizontal plane to receive the blank at the end of the strip, which is delivered thereto by the rollers $g^2$ H.

$i$, Figs. 14 and 15, represents a central movable portion of the bed-block corresponding in shape and size to the central portion, $y$, Figs. 20 and 21, of the box-blank, as shown.

$i'$, Fig. 14, represents a rod depending from the central portion, and $i^2$ a coiled spring surrounding the rod, the lower end of which spring bears upon the table below and the upper end against the bottom surface of the central portion, as shown. By means of this construction the central portion, $i$, is adapted to yield in a downward direction, as indicated in Fig. 26, when pressure is brought to bear upon it.

$i^3$, Figs. 14 and 15, represents an independent block resting in a recess of the central portion, $i$, and forming a portion of the supporting-surface of the same, which block is provided with rods $i^4$ $i^4$, extending downward through the central portion, as shown. By means of this construction the block $i^3$ may be lifted by means of the rods $i^4$ $i^4$ out of the recess of the central portion at the proper time for the purpose of raising the completed box, which rests upon it, to that plane in which moves the lever for discharging the box from the machine.

J, Figs. 2 and 7, represents a shaft supported by proper bearings, $j$ $j$, Fig. 7, rising from the table $a^2$, which is provided at one end with the bell-crank arms $j'$ $j^2$, the former having a friction-roller, as shown, and at the other end with the arm $j^3$, as shown.

$j^4$, Figs. 2 and 8, represents a connecting-rod uniting the moving end of arm $j^3$ with the moving end of one of the arms $j^5$, rising from the rock-shaft $j^6$, as shown.

$j^7$ $j^7$ represent arms extending in a downward direction from the rock-shaft, which arms are united together by the transverse rod $j^8$, as shown.

$j^9$ $j^9$ represent connecting-rods, by means of which the transverse rod $j^8$ is united to the transverse rod $j^{10}$ on the front side of the machine.

$j^{11}$ $j^{11}$ represent finger-bars extending from the upper arms of the rock-shaft forward toward the space above the central portion, and $j^{12}$ $j^{12}$ finger-bars extending from the transverse rod $j^{10}$ rearward toward the space above the central portion. These finger-bars are so located relatively to the central space that the ends of the same are capable of an inward horizontal movement in vertical planes which are adjacent to the planes occupied by the end pieces $y'$ $y'$, Fig. 25, folded from the side pieces, $y^2$ $y^2$, as shown. By the action of these finger-bars the end pieces $y'$ $y'$ of the box-blank, at the proper time in the movement of the machine, are folded into the position occupied by them when the box is complete.

$b^5$, Figs. 2 and 9, represents a cam on the main shaft, which is adapted by contact with the friction-roller on arm $j'$ to give the shaft J movement in one direction.

$b^6$, Fig. 9, represents a friction-roller on the same cam, which is adapted by contact with the arm $j^2$ to give the shaft J movement in the other direction. By means of this construction the shaft J is given an oscillating movement when the machine is in operation, and by means of this oscillation the finger-bars are advanced to fold in the end piece $y'$ of the box-blank, which has been before delivered to the bed-block I by the rollers, and then withdrawn to permit the introduction of a new blank.

K, Figs. 2 and 13, represents a lever supported by the rock-shaft $k$, Fig. 2, held in proper bearings in the standards $k'$ $k'$, rising from the bed-block of the box-forming mechanism, which lever is capable of lateral adjustment upon the rock-shaft $k$, if desired.

$k^2$, Fig. 2, represents a set-screw by means of which the lever is rigidly secured in place when adjusted.

$k^3$ represents a balance-weight located at the lower end of the lever, by means of which the friction-roller $k^4$, located near the rear end of the lever, is kept in contact with its actuating-cam, hereinafter referred to.

$k^5$, Fig. 13, represents a recess in the front end of the lever, and $k^6$ a former-block having a vertical shank or standard, $k^7$, with transverse rod $k^8$ extending across a proper recess in the same, which rod is adapted to lie in the recess $k^5$, as shown.

$k^9$, Figs. 1 and 2, represents a vertical standard having a guide-box, $k^{10}$, adapted to guide the shank of the former-block in its vertical movements.

$k^{11}$ $k^{11}$ represent fixed plates upon the guide-box, by means of which the completed box is pushed off from the former-block when the latter rises.

$b^7$, Fig. 13, represents the actuating-cam on the main shaft before referred to, which is provided with the incline $b^8$ terminating in the point $b^9$, and with the concentric portion $b^{10}$, terminating in the inclined portion of point $b^{11}$, the purpose of which will be hereinafter described. By means of this construction the rear end of the lever is elevated at the proper time, first to move the former-block $k^6$ down onto the supporting-bed, as shown in Fig. 22, for the purpose of holding the body $y$ of the blank while the side plunger-blocks, $l^{11}$ $l^{12}$, press in the sides, as shown in Fig. 23, and the fingers $j^{11}$ $j^{12}$ fold in the end portions $y'$ of the sides $y^2$, as shown in Fig. 25, and then to move the block below the horizontal plane of the supporting-bed, as shown in Fig. 26, the central supporting portion yielding to permit this action for the purpose of bending the end pieces of the blank, so that the same may be pressed to place by the action of the end plunger-blocks.

L, Fig. 12, represents a lever-bar pivoted to a shaft, $l$, held by proper bearing-standards depending from the table $a^2$, the rear end of which is united to the rear edge of the table by the spring $l'$, as shown, and the front end of which is united by means of connecting-rods $l^2$ to the horizontal arms of the bell-crank levers $l^3$ $l^4$, hereinafter referred to.

$l^5$ represents a vertical rod, the lower end of which rests upon the rear end of the lever-bar L, which rod extends up through the table, and is provided at its upper end with a friction-roller, $l^6$, as shown.

$l^7$ represents a bearing-sleeve depending from the table, by means of which the rod is properly held and guided in its vertical movements.

$l^3$ $l^4$ represent the bell-crank levers before referred to, held in proper bearings on the lower side of the table $a^2$, and $l^8$ $l^9$ the vertical arms of the same, each of which is provided at its upper end with a recess, $l^{10}$, as shown.

$l^{11}$ $l^{12}$ represent the side plunger-blocks resting upon the upper surface of the bed-block I, which blocks are provided upon their sides with projections extending into corresponding recesses in the fixed guide-pieces $i^5\ i^5$, as shown.

$l^{13}$ represents a recess formed in one end of the block, in which is held a rod adapted to lie in the recess $l^{10}$ of the vertical arm of the bell-crank lever.

$b^{12}$ represents a cam upon the main shaft, by means of which the vertical rod $l^5$ is given at the proper time in the action of the machine a downward movement against the action of the spring $l'$. By means of this construction the vertical rod is depressed at the proper time, and consequently the plunger-blocks, through the intermediate mechanism described, are caused to move forward and fold the sides of the box-blanks against the former, as indicated in Fig. 23.

M, Figs. 2 and 15, represents a lever-arm pivoted upon a proper bearing-block rising from the frame-plate $a^2$, which is provided at its rear end with a friction-roller, $m$, set at right angles to the arm, as shown.

$m'$ represents a connecting-rod, by means of which the front end of the lever-arm M is united to the rear end of the lever-arm $m^2$ on the opposite side of the central space, as shown.

$m^3\ m^3$ represent end plunger-blocks secured to the front ends of the levers M $m^2$, as shown, which are provided upon their sides with projections extending into corresponding recesses in the fixed guide-pieces $i^5$, as shown.

$m^4$ represents a spring of any proper construction, by means of which the lever-arms of the plunger-blocks are returned to their normal position after having been moved therefrom.

$b^{14}$, Figs. 2 and 19, represents a cam on the main shaft, having a projection upon one side, by means of which the rear end of the lever-arm M is given, at the proper time in the action of the machine, a lateral movement in one direction against the action of the spring $m^4$. By means of this construction the cam is caused, through the intermediate mechanism described, to move forward the plunger-blocks at the proper time to press the end pieces $y^3\ y^3$, Fig. 21, of the box-blank against the previously-folded end pieces $y'\ y'$, for the purpose of completing the box, as indicated in Fig. 27.

N, Fig. 14, represents a lever-arm pivoted to a proper bearing, $n$, below the table, as shown.

$n'$ represents a vertical rod, the lower end of which rests upon the rear end of the bar N, which rod extends up through the table, and is provided at its upper end with a friction-roller, $n^2$, as shown.

$n^3$ represents a bearing-sleeve depending from the table, by means of which the rod is supported in such manner as to move freely in a vertical direction.

$n^4$ represents an arm attached to the front end of lever-bar N, which is provided with a vertical sleeve, $n^5$, adapted to inclose the rod $i'$ of the movable portion $i$, and with bearing-face $n^6$, adapted to bear against the lower ends of rods $i^4$, as shown.

$b^{13}$ represents a cam upon the main shaft, by means of which the vertical rod $n'$ is depressed at the proper time in the movement of the machine. By the depression of the vertical rod $n'$ the rods $i^4$ are lifted against the action of gravity for the purpose of elevating the completed box above the horizontal plane of the foundation-bed.

O, Figs. 2 and 16, represents a striker-bar pivoted upon the block $m^5$, which is properly bent, and provided at its front end with a right-angled flange, $o$, as shown.

$o'$ represents a horizontal rod, the rear end of which is loosely attached to the short end of the striker-bar, as shown, and the front end of which is provided with a friction-roller, $o^2$, as shown.

$o^3$, Fig. 2, represents a spring of any proper construction, by means of which the striker-bar is returned to its normal position to eject the box, after having been moved therefrom by the cam $b^{15}$.

$b^{15}$ represents a cam on the main shaft, by means of which the horizontal rod is forced forward at the proper time in the movement of the machine. By the forward movement of the long end of the striker-arm, the completed box, which has been lifted above the horizontal bed, is discharged from the machine.

The operation is substantially as follows: The standard A, having been supplied with a roll of pasteboard of proper width, and the end of the same having been passed over the guiding-plate C and about the roller E to and through between the rollers $g^2$ H, the machine may be set in motion. Movement is communicated to the machine by means of the pulley $b'$ from any proper source of power. As this shaft receives a uniform revolution, it follows that all the parts which are rigidly connected therewith will have also a continuous movement. The rollers $g^2$ H, however, which give movement to the strip, receive motion themselves through mutilated gearing $g'\ b^1$, and hence these remain stationary at regular intervals. The strip passes from the roll, as shown in Fig. 1, first to the guiding-plate C, when it is moved into the proper line to be acted upon by the various mechanisms which convert it into boxes, and then to the lower surface of the table, where the glue is applied at the proper points by the fingers $d^4$ of the lever D, the latter being elevated by the reaction of the spring $d^5$, as has been before described. The strip then passes around the roller E, which is adjusted nearer to or farther from the table, according as it may be desired to afford more or less time for the cooling of the glue before the box is made, and moves on between the supporting-bed $f^{11}$, Fig. 6, and the vertically-moving die-block $f^3$. By the depression of the die-block the excess portion $x$ is cut out of the strip, and the lines $x'$ are scored. The strip then passes between the rollers $g^2$ H, and by the action of the blades $h\ h$ is transversely scored on the lines $x^2\ x^2$, and by the action of the blade $h'$ is partly cut through on the line $x^3$. The rollers also deliver the box-blank, which is formed from the strip by their action, to the box-forming mechanisms. The operation of these mechanisms is substantially as follows: The box-blank is first advanced into such position upon the bed-block that its body portion coincides accurately with the movable portion $i$ of the bed-block. The former-block $k^6$ is then caused to descend upon the body portion of the blank and remain stationary for an instant, while the side pieces, $y^2 y^2$, and the end portions $y'$ $y'$ are folded to place, as indicated in Figs. 23, 24, and 25. The former-block is then still further depressed, as indicated in Fig. 26, for the purpose of bending in the end pieces $y^3 y^3$, so that they may be folded to place by the end plunger-blocks, as indicated in Fig. 27. The descent of the former-block is caused by the passage of the inclined portion $b^8$ of the cam $b^7$ over the wheel $k^4$ of the lever K. Its movement is arrested when the point $b^9$ of the cam reaches the roller, and it is held stationary in this position while the concentric portion $b^{10}$ of the cam is passing the roller. While thus held stationary the side plunger-blocks, $l^{11} l^{12}$, are advanced to fold in the side pieces, $y^2 y^2$, of the blank, this movement being effected by the reaction of the spring $l'$ after the blocks have been withdrawn by the action of the cam $b^{12}$. During this period, also, the finger-bars $j^{11} j^{12}$ are advanced to fold in the end pieces $y'$ $y'$ by the action of the cam $b^5$ and the shaft J and its attachments. The further descent of the former-block is effected by the incline of portion $b^{11}$ of the cam $b^7$, the spring $i^2$, Fig. 14, of the movable bed-block yielding to permit this action. After the depression of the former-block, the end plunger-blocks, $m^3 m^3$, Fig. 15, are advanced to press to place the end pieces $y^3 y^3$ of the blank, this action being effected by the cam $b^{15}$ acting on the lever M and its attachments. The end pieces of the blanks being provided with glue, this action of the end plunger-blocks serves to complete the box. After the box has been completed, by the advance of the end plunger-blocks the former-block rises to its upper position, the box being disengaged from it by the action of the pusher-plates $k^{11}$, Fig. 1, as shown. The box itself is then lifted by the action of the independent block $i^3$ into the range of action of the ejecting-lever O, this movement of the block being effected by the action of the cam $b^{13}$ upon the lever N and its attachments. By means of the ejecting-lever O the completed box is discharged from the machine. The striking action of this lever results from the reaction of the spring $o^3$ after the same has been expanded by the action of the cam $b^{15}$ and the rod $o'$.

Having fully described our invention, what we claim as new, and desire to secure by Letters Patent, is—

1. In combination with the former-block $k^6$ and the cam $b^7$, having the incline of portion $b^{11}$, the end plunger-block, $m^3$, as described.

2. In combination with the bed-block $i$, the independent block $i^3$, for raising the completed box, as described.

3. In combination with the shaft J, having the arms $j' j^2$, and the cam $b^5$, the arm $j^3$, connecting-rod $j^4$, and finger-bar mechanism $j^5 j^6$ $j^7 j^8 j^9 j^{10} j^{11} j^{12}$, as described.

4. The box-forming mechanism, substantially as described, consisting, essentially, of a former-block mechanism having a vertical movement, a yielding bed-block mechanism, side plunger-block mechanism, finger-bar mechanism, and end plunger-block mechanism.

5. The combination of the following elements: mechanism, substantially as described, for applying glue to a continuous strip, mechanism, substantially as described, for scoring the strip in a longitudinal direction and cutting out the excess portions, mechanism, substantially as described, for advancing the strip with an intermittent movement, scoring and cutting the same transversely, and mechanism, substantially as described, for folding the blank thus formed into a complete box.

6. The combination of the following elements: mechanism, substantially as described, for applying glue to a continuous strip, mechanism, substantially as described, for scoring the strip in a longitudinal direction and cutting out the excess portion, mechanism, substantially as described, for advancing the strip with an intermittent movement and scoring and cutting the same transversely, mechanism, substantially as described, for folding the blank thus formed into a completed box, and mechanism, substantially as described, for lifting the completed box and ejecting it from the machine.

7. In combination with the former-block $k^6$ and mechanism, substantially as described, for giving it two distinct downward movements, mechanism, substantially as described, for folding in the side pieces after the first movement, and mechanism, substantially as described, for folding in the ends after the second movement.

8. The combination of the following elements: a former-block substantially as described, mechanism, substantially as described, for giving the former-block two distinct downward movements, end and side plunger-blocks and finger-bars, with actuating mechanism substantially as described, and mechanism, substantially as described, for raising the completed box.

This specification signed and witnessed this 11th day of July, 1882.

EBENEZER B. BEECHER.
ROBERT T. ELLIOTT.

Witnesses as to E. B. Beecher:
L. W. BEECHER,
H. A. BARNES.

As to Robt. T. Elliott:
WM. H. SWIFT,
GEORGE O'NEILL.